United States Patent [19]
Schultz

[11] Patent Number: 6,120,829
[45] Date of Patent: Sep. 19, 2000

[54] METHOD OF PRESSING DOUGH PORTIONS

[76] Inventor: George A. Schultz, 176 Ohio, New Braunfels, Tex. 78130

[21] Appl. No.: 09/330,229

[22] Filed: Jun. 10, 1999

Related U.S. Application Data

[62] Division of application No. 08/905,591, Aug. 4, 1997, Pat. No. 5,937,739.

[51] Int. Cl.$^7$ .............................. A21D 6/00; A21D 8/08; A21D 13/00; A23P 1/00
[52] U.S. Cl. ...................... 426/560; 426/653; 426/468; 426/505; 426/517; 426/523
[58] Field of Search ................................. 426/549, 560, 426/653, 468, 505, 496, 512, 520, 517, 523; 99/349, 432

[56] References Cited

U.S. PATENT DOCUMENTS

| | | | |
|---|---|---|---|
| 2,585,893 | 2/1952 | Young | 154/1 |
| 3,029,676 | 4/1962 | Rabinow | 83/382 |
| 3,447,487 | 6/1969 | Landers et al. | 107/14 |
| 3,565,015 | 2/1971 | Jorgensen | 107/15 |
| 4,070,962 | 1/1978 | Peterson | 100/209 |
| 4,241,648 | 12/1980 | Longenecker | 99/349 |
| 4,316,410 | 2/1982 | Davis, Jr. | 100/48 |
| 4,508,025 | 4/1985 | Schultz | 99/353 |
| 4,648,314 | 3/1987 | Plicht et al. | 99/373 |
| 4,664,025 | 5/1987 | Martinez | 99/331 |
| 4,683,813 | 8/1987 | Schultz | 99/353 |
| 4,696,227 | 9/1987 | Van Buskirk | 100/902 |
| 4,838,153 | 6/1989 | Escamilla et al. | 99/349 |
| 5,095,813 | 3/1992 | Escamilla et al. | 99/349 |
| 5,396,833 | 3/1995 | Atwood et al. | 99/353 |
| 5,549,040 | 8/1996 | Naramura | 99/349 |

*Primary Examiner*—Keith D. Hendricks
*Assistant Examiner*—Drew Becker
*Attorney, Agent, or Firm*—George R. Schultz; Madan, Mossman, Schultz & Sriram

[57] ABSTRACT

The invention provides a press for bread products which includes two horizontally opposed, inclined press blocks which contain electromagnets with a trapezoidal pendulum block is pivotally mounted between the press blocks. The pendulum includes two large permanent magnets. The polarity of the electromagnets is switched in a manner to force the pendulum to swing from contact with one press block to the other. A dough ball distribution system is also provided which distributes dough balls to interstitial positions between the pendulum and the press blocks, so that when the polarity of the electromagnets is switched, the pendulum press block presses the dough ball into a tortilla. A heating system is provided to heat the press blocks and pendulum block to partially cook the tortilla and aid in removing the pressed blocks after it is pressed. Controlling circuitry is also provided which controls the activation of the heating system, the motion of the press block, the timing between the dough ball distributor and movement of the pendulum press block.

25 Claims, 3 Drawing Sheets

METHOD OF PRESSING DOUGH PORTIONS

This is a divisional of application Ser. No. 08/905,591 filed Aug. 4, 1997 now U.S. Pat. No. 5,937,739.

TECHNICAL FIELD

This invention relates generally to machines for making tortillas, and particularly concerns an automatic machine for pressing and partially cooking tortillas.

BACKGROUND ART

The rapid rise in popularity of Mexican food has created a need for medium capacity tortilla machines that can be used in a restaurant environment. These machines process and cook, to a varying degree, tortilla dough portions into tortillas. In some cases, other flat bread products such as pizza shells are pressed and cooked as well.

Several prior art examples exist which illustrate the mechanization of the tortilla making process. The invention described in U.S. Pat. No. 4,683,813 to Schultz employs a press mechanism which provides for a synchronized pressing motion between a press plate and a rotating cooking disk. The disk rotates in a horizontal plane while the plate moves in a vertical plane. The synchronized motion is accomplished by a series of gears, extension arms, and drive shafts.

Another example is disclosed in U.S. Pat. No. 4,508,025 to Schultz. Here, a flat plate is pulled down against a stationary platen by an arrangement of cams, extension arms, and springs, thereby pressing a dough ball into a round flat shape.

A third example can be found in U.S. Pat. No. 4,838,153 to Ischiomeli et al. The invention disclosed in Ischiomeli pivots one heated platen upward against another. Both of the platens are at an angle relative to the horizontal. As a result, after a tortilla is pressed, it slides downward due to the force of gravity alone.

None of these inventions have proved to be completely satisfactory. Each has an abundance of moving parts which are difficult to clean, difficult to service, and difficult to maintain. Also, the mechanisms used to release the tortilla from the pressing platens are not completely effective, resulting in the dough sticking to the platens and other cleaning and mechanical problems. Additionally, the degree to which the bread product is toasted by each of the prior art mechanisms requires time consuming or complex mechanical adjustments. Finally, each of the prior inventions require mechanical adjustment in order to set and reset the thickness of the tortilla.

SUMMARY OF THE INVENTION

The preferred embodiment of the invention includes a press mounted in a steel enclosure having a removable top. An entrance port in the removable top allows admittance of dough balls, and a slot in the bottom of the enclosure provides an exit for tortillas.

Inside the enclosure, two opposing stationary press blocks are positioned above the slot in the bottom of the enclosure. The inner face of each stationary press block is angled to form an inclined plane, the bottom of which is aligned with the slot in the bottom of the enclosure.

The stationary press blocks are constructed of a ceramic material, and a steel plate is embedded in the inner face of each block. Within each stationary press block, a coercive element such as a relatively large electromagnet is positioned so that one of its magnetic poles is in contact with the steel plate. Each stationary press block also contains two internal rod-type electrical heating elements and two longitudinal holes to heat the block.

A generally trapezoidal movable press block is positioned between the stationary press blocks. The movable press block is constructed of the same ceramic material as the stationary press blocks. Two opposing press faces of the movable press block are at generally the same inclined angle as the corresponding opposing faces of stationary press blocks. A single support plate extending from the bottom of the movable press block is pivotally and removably positioned above and parallel to the central longitudinal axis of the slot in the bottom of the enclosure.

A steel plate is imbedded in the surface of each of the press faces of the movable press block. Two large permanent magnets are positioned within the movable press block directly adjacent to and in contact with each steel plate. The magnets are arranged so that the north pole of one magnet is in contact with one steel plate and the south pole of the other magnet is in contact with the other steel plate.

A ducting system is included which redirects hot air off of heated grill surface through the holes in the stationary press blocks and downward over their faces in order to maintain the press blocks at a uniform temperature efficiently and aid in lifting and removing partially cooked tortillas from the stationary press blocks after they have been pressed. To further aid in removing the partially cooked tortillas, each steel plate may be coated with Teflon to reduce friction between the tortilla and plate.

A feeder assembly is provided to deliver dough balls to the press. The feeder assembly is supported by a frame that is removably attached to the steel enclosure in which the press is mounted. The frame supports two sprockets that, in turn, support a drive chain. A series of cups for holding dough balls are attached to the drive chain at regular intervals.

A ratchet mechanism is attached to one of the sprockets in order to drive the chain and the cups about the sprockets. An electric solenoid drives the ratchet assembly. Each time the solenoid actuated, the chain tips a cup to a vertical position and drops a dough ball into the entrance port in the top of the enclosure. The feeder assembly is positioned so that the cup becomes vertical directly above the entrance port in the lid of the steel enclosure.

A timer is used to alternately switch the polarity of the current applied to the electromagnets in the stationary press blocks. Both electromagnets are connected to have the same polarity. Therefore, when current is supplied to the electromagnets, the permanent magnets in the movable press block are repelled on one side and attracted on the other side, forcing a pivotal movement of the movable press block from a first position close to one stationary press block to a second position close to the other stationary press block, or vice versa. At approximately the same time, the solenoid is actuated, thereby advancing the chain and tipping a cup.

In operation, uncooked dough balls are placed in the cups. A timer activates the solenoid and switches the polarity of the electromagnets in the stationary press blocks. The solenoid advances the chain and tips a cup over the entrance port in the top of the steel enclosure. The dough ball from the cup drops through the entrance port and rolls to one side or the other of the movable press block, depending on the position of the movable press block, and finally lodges in the interstitial position between one steel plate of the movable press block and the steel plate imbedded in the first stationary press block.

After a predetermined interval, the timer again activates the solenoid and reverses the polarity of the current supplied to the electromagnets in the stationary press block, causing the movable press block to pivot toward the first stationary press block and a second dough ball to fall out of a cup. As the movable press block pivots, the dough ball between the movable press block and the first stationary press block is pressed into a flat, circular shape, i.e., a tortilla. A second dough ball simultaneously rolls to the interstitial position between the movable press block and the second stationary press block. For a predetermined interval, the tortilla is toasted by heat from the first stationary press block and the movable press block. After that interval, the cycle repeats.

As the movable press bock pivots toward the second stationary press block, the toasted tortilla is lifted off of the face of the first stationary press block by hot air from the ducting system and gravity causes it to drop through the bottom slot onto a grill surface for final cooking.

The present invention has readily apparent advantages over the prior art. For instance, when pressing a dough ball into a tortilla, the magnetic forces are evenly distributed along the press face of the movable press block and the press face of the corresponding stationary press block. As a result, the force is applied evenly to the dough ball, thereby producing a tortilla having a substantially constant thickness. To adjust the thickness of the tortilla, one need only adjust the voltage supplied to the electromagnets.

Additionally, the press of the present invention has very few moving parts to clean or maintain; therefore, cleaning the press is extremely simple. The lid of the enclosure is removed, and the movable press block is removed by merely lifting it out of the enclosure. The movable press block and the stationary press blocks are then readily accessible for cleaning.

Additionally, the use of redirected air through a novel ducting system efficiently maintains constant heat throughout the apparatus as well as aiding in removal of the tortilla from the contact surfaces after it has been partially cooked.

Further, the degree in which the tortilla is toasted is easily controlled by setting the predetermined time interval on the timer obviating the need for changing motor speeds, gears or other mechanical settings as is required by the prior art.

Other advantages will be apparent to those skilled in the art after reviewing the description of the preferred embodiment and the attached drawings which illustrate it.

BRIEF DESCRIPTION OF THE DRAWINGS

A preferred embodiment of the invention will be described in detail with reference to the attached drawings in which.

DESCRIPTION OF THE PREFERRED EMBODIMENT

Figure 1:
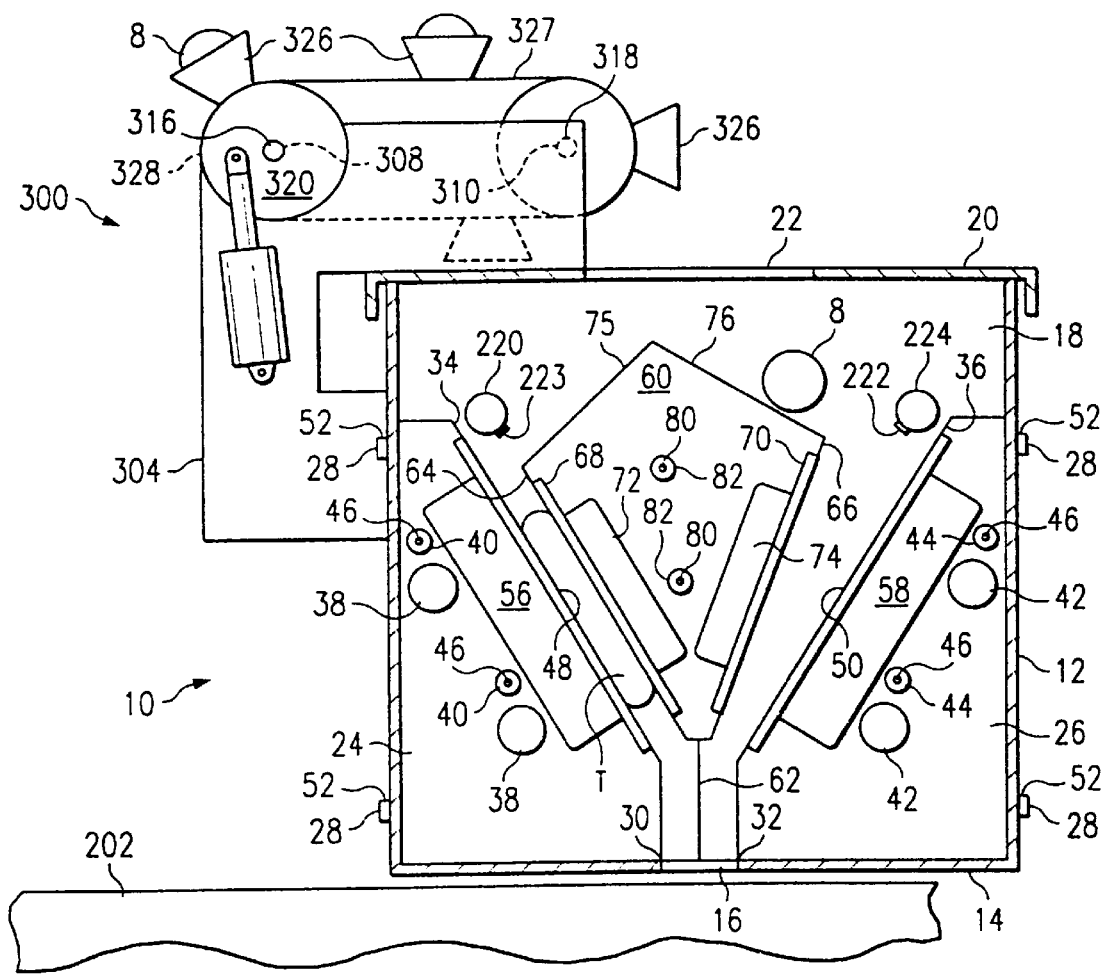
FIG. 1 is a sectional front view of a bidirectional magnetic ceramic tortilla press in accordance with the invention.
Figure 2:
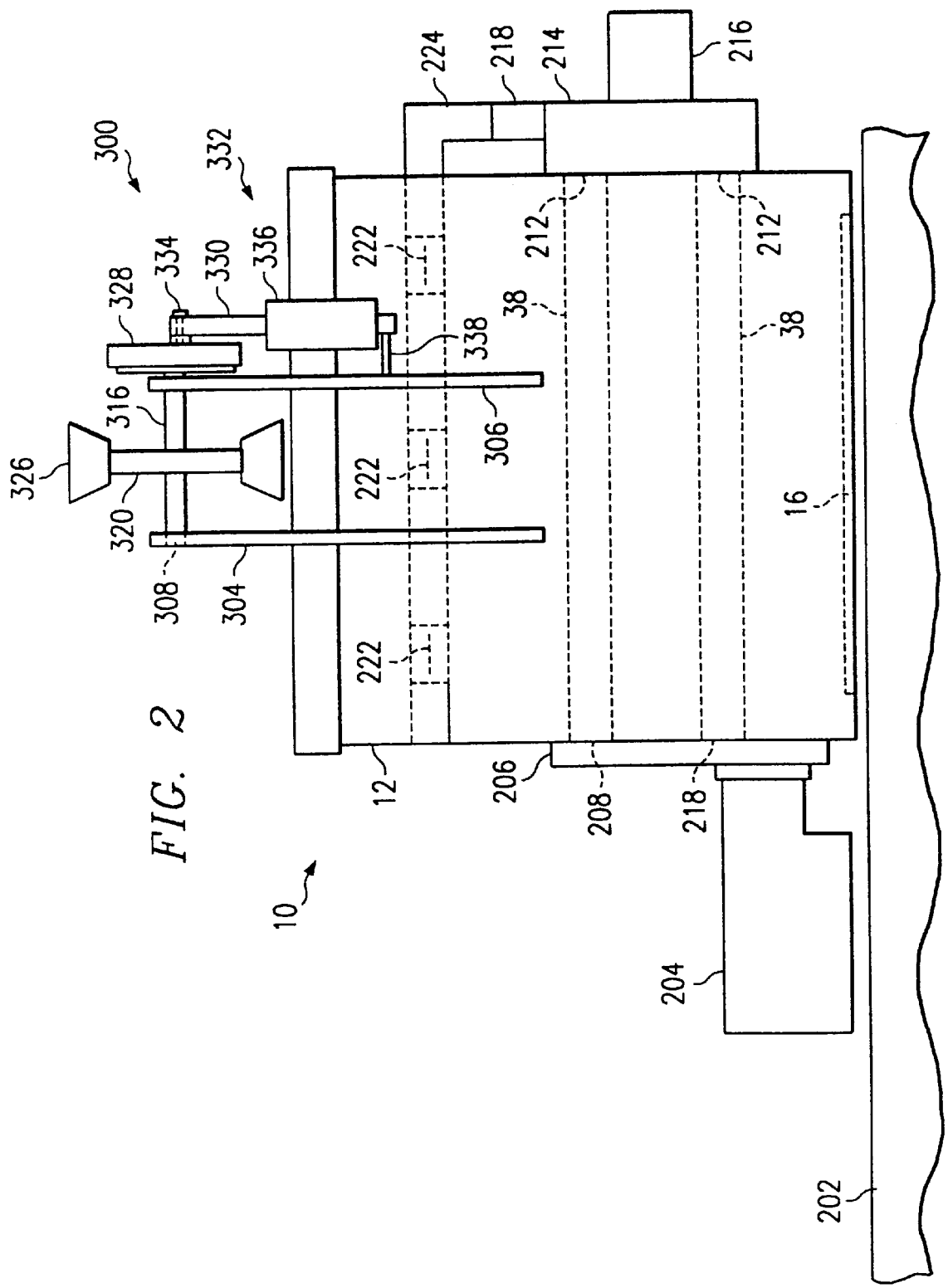
FIG. 2 is a side view of the tortilla press of FIG. 1.

FIGS. 1 and 2 illustrate a preferred embodiment of a bidirectional magnetic ceramic tortilla press 10 in accordance with the invention. Square steel enclosure 12 serves to house and support the internal components of the press 10. Enclosure 12 includes bottom 14 having slot 16 therein and open top 18. Top 18 of enclosure 12 is fitted with removable lid 20 that includes entrance port 22 that is disposed directly over slot 16 when lid 20 is installed on top 18 of enclosure 12.

Although enclosure 12 of the preferred embodiment is constructed of steel, it will be appreciated that other materials could be used, such as aluminum, stainless steel, or high temperature plastic.

Two stationary press blocks 24, 26 are removably mounted within enclosure 12 by bolts 28. As best seen in FIG. 1, a lower, inner edge 30,32 of each stationary press block 24, 26 is parallel to slot 16 in bottom 14 of enclosure 12.

In the preferred embodiment of the invention, the stationary press blocks 24, 26 are constructed of a ceramic kiln brick material. Other ceramic or non-magnetic materials, such as cast aluminum, may also be employed.

Each stationary press block 24, 26 is shaped so that inner face 34, 36 of each forms an inclined plane that is parallel to slot 16. Inner faces 34, 36 of stationary blocks 24, 26 extend from adjacent to opposed sides of top 18 of enclosure 12 to immediately above slot 16 in bottom 14 of enclosure 12.

Each stationary press block 24, 26 is solid with the exception of two sets of longitudinal holes 38, 40, 42, 44 extending parallel to inner face 34, 36. One set of holes 38, 42 serves as ducts through which hot air is passed to heat stationary blocks 24, 26, as will be described below. Each of the other set of holes 40, 44 contains an electrical rod-type heater 46. Rod-type heaters 46 are used to pre-heat and maintain stationary press blocks 24, 26 at operating temperature. In an alternate embodiment, holes 38 and 42 are not present. The operating temperature of the blocks are maintained solely by electrical heaters formed integrally in the blocks (not shown) or by the proximity of the blocks to other heated elements of the apparatus.

Steel plate 48, 50 is embedded in inner face 34, 36 of each stationary press block 24, 26. Each steel plate 48, 50 may also be coated with a Teflon surface to aid in reducing friction between toasted tortillas and the plate itself; thereby aiding in the removal of toasted tortillas. Mounting bolts 28 are also imbedded in stationary press blocks 24, 26. Mounting bolts 28 are arranged to pass through corresponding holes 52 in enclosure 12. Nuts (not shown) are installed on bolts 28, firmly affixing stationary press blocks 24, 26 to enclosure 12. It will be appreciated that stationary press blocks 24, 26 are easily removable from enclosure 12 for cleaning and maintenance.

Also embedded in each stationary press block 24, 26, beneath inner face 34, 36, is an electromagnet 56, 58. Each electromagnet 56, 58 is in direct contact with the corresponding steel plate 48, 50 embedded in the inner face 34, 36 of stationary press block 24, 26. In the preferred embodiment of the invention, electromagnets 56 and 58 are part number 012, offered by Magnetic Technologies, Boxne City, Mich. Each is rated at 72 watts at twelve volts, and is constructed to withstand continuous use at over 425°, that is, over the operational temperature of the invention. Each magnet is capable of supporting 1,050 pounds when supplied with current. Of course, other electromagnets of varying sizes and ratings are available that can fulfill the function of electromagnets 56, 58.

Movable press block 60 is pivotally mounted between stationary press blocks 24, 26. In the preferred embodiment, movable press block 60 is constructed of the same ceramic material as stationary press blocks 24, 26. Movable press block 60 is generally trapezoidal in shape and is supported above slot 16 by suspension plate 62 which is embedded vertically in the bottom movable press block 60 parallel to the long axis of the trapezoid. Suspension plate 62 is slightly longer than slot 16, so it extends above the central longitudinal axis of slot 16 and is pivotally supported at each end of the slot 16 by the bottom 14 of the enclosure 12.

Movable press block 60 has two downwardly facing angled press faces 64, 66. A steel plate 68, 70 is embedded in each press face 64, 66, and below each steel plate 68, 70 a permanent magnet 72, 74 is embedded. Each steel plate 48, 50 may also be coated with a Teflon surface to aid in reducing friction between toasted tortillas and the plate itself; thereby aiding in the removal of toasted tortillas. In the preferred embodiment, one permanent magnet 72 is embedded with its north pole facing outwardly from movable press block 60, and the other permanent magnet 74 is embedded with its south pole facing outwardly. Two shuttle surfaces 74, 76 at the top of the movable press block 60 form an apex that is positioned directly below entry port 22 in the lid 20 of enclosure 12.

In another embodiment, movable press block 60 has embedded in it two electromagnets in place of permanent magnets 72, 74. In this embodiment, current is supplied to the electromagnets in movable press block 60 via relay 406 as will be described in more detail later.

In another embodiment, movable press block 60 has embedded in it, one permanent magnet centrally disposed between steel plates 68, 70. In this embodiment, movable press block 60 is constructed so that the single press block magnet is held in contact with both plates through a central cavity in movable press block 60 (not shown).

In another embodiment, the movable press block has embedded in it, one electromagnet centrally disposed between steel plate 68, 70. In this embodiment, movable press block 60 is constructed so that the single electromagnet is held in contact with both plates through a central cavity in movable press block 60 (not shown). In this embodiment, the single electromagnet is supplied with current of one polarity via power supply 402 which does not change during operation of the press.

Movable press block 60 is free to pivot between two positions in relation to stationary press blocks 24, 26. When in the left position as shown in FIG. 1, the left press face 64 of movable press block 60 is immediately adjacent and substantially parallel to steel plate 48 embedded in the inner face 34 of left stationary press block 24. When in the right position (not shown), right press face 66 of movable press block 60 is immediately adjacent and substantially parallel to steel plate 50 embedded in inner face 36 of right stationary press block 26.

A pair of rod-type heaters 80 are disposed within two centrally located longitudinal holes 82 in movable press block 60. In the preferred embodiment of the invention, the rod-type heaters 80 employed are manufactured by Chromalloy Corporation of Tennessee, and are used to preheat and maintain movable press block 60 at operating temperature. Of course, other similar heaters may be employed. In an alternate embodiment, holes 82 and rod-type heaters are not present in movable press block 60. In this embodiment, the proper operating temperature of movable press block 60 is maintained by its close proximity to and contact with other heated elements of the invention.

As shown in FIG. 2, in the preferred embodiment of the invention, press 10 is located closely adjacent to heated grill surface 202. Heated air from this grill surface is used to heat the stationary press blocks. A ducting systems is supplied to accomplish this. Intake duct 204 is threaded into a first manifold 206 that is attached to enclosure 12. Directly adjacent to each longitudinal hole 38, 42 in stationary press blocks 24, 26 is hole 208 through the wall of enclosure 12 that is in fluid communication with first manifold 206.

Second set of holes 212 in enclosure 12 at the other end of longitudinal holes 38, 42 in stationary press blocks 24, 26 are in fluid communication with second manifold 214. Second manifold 214 directs air into the intake of impeller 216. The output of impeller 216 is held in ducted communication with third manifold 218. Third manifold 218 splits into right arm 224 and left arm 220, which both extend the length of press enclosure 12 and include a plurality of nozzles 222, 223. Nozzles 222, 223 are arranged to direct heated air downwardly over inner faces 34, 36 of stationary press blocks 24, 26. When activated, impeller 216 draws heated air from adjacent grill surface 202 through intake duct 204, manifold 206, longitudinal holes 32, 38 into second manifold 214. Impeller 216 then forces heated air upward into third manifold 218 and on into right arm 224 and left arm 220 to be distributed through plurality of nozzles 222, 223. Thus, heated air from grill surface 202 is used to evenly and efficiently heat the stationary press blocks 24, 26 from both the inside and the outside, thereby decreasing the electricity consumed in heating them with rod-type heaters 80. Additionally, heated air from the nozzles 222 and 223 aids in lifting and pushing partially cooked tortillas off of stationary press blocks 24 and 26 thereby avoiding previously encountered sticking problems.

In order to supply dough balls to the press, feeder assembly 300 is provided. Feeder assembly 300 is removably attached to enclosure 12 by conventional means. Feeder assembly 300 is supported by two parallel plates 304, 306. In the preferred embodiment of the invention, plates 304, 306 are constructed from machined aluminum, but they could also be made of steel, heat resistant plastic, or other rigid materials. Each of plates 304, 306 includes two holes 308, 310, one adjacent to either end. The holes 308, 310 in each plate 304, 306 are aligned with the corresponding holes 308, 310 in the other plate 304, 306. Two sets of rotary bearings (not shown) are pressed into holes 308, 310. The bearings support two shafts 316, 318. The shafts 316, 318 support sprockets 320, 322. Steel link chain 324 is fitted around sprockets 320, 322, and plurality of stainless steel cups 326 are attached along chain 324 at regular intervals. Each cup 326 is riveted to a single link of chain 324, so that the attachment of cups 326 does not interfere with the rotation of the chain 324 around sprockets 320, 322.

As best seen in FIG. 2, shaft 316 extends outwardly beyond plate 306 and is attached to single-direction rachet assembly 328. Single-direction ratchet assembly 328 allows shaft 316 to rotate only in clockwise direction as viewed in FIG. 1. Ratchet assembly 328 is attached to piston 330 of solenoid 332 by first pivot pin 334. Solenoid coil 336 of solenoid 332 is attached to plate 306 by second pivot pin 338. When electrical current is applied to the solenoid coil 336, solenoid piston 330 moves upwardly as viewed in FIG. 1, causing the ratchet assembly 328 to rotate shaft 316 clockwise. When electrical current is removed from the solenoid coil 336, the piston 330 retracts, but the ratchet assembly 328 does not rotate shaft 316 counterclockwise. Thus, solenoid 332 and ratchet assembly 328 cooperate to rotate shaft 316 incrementally clockwise, thereby causing the chain 324 to advance in steps.

It should be recognized that other methods of advancing sprockets 320, 322 such as an electrically-controlled stepper motor (not shown) or pneumatic cylinders (not shown) with appropriate controls, or manual feeder assemblies (not shown) can also be employed in other embodiments of the invention with equal success.

Figure 3:
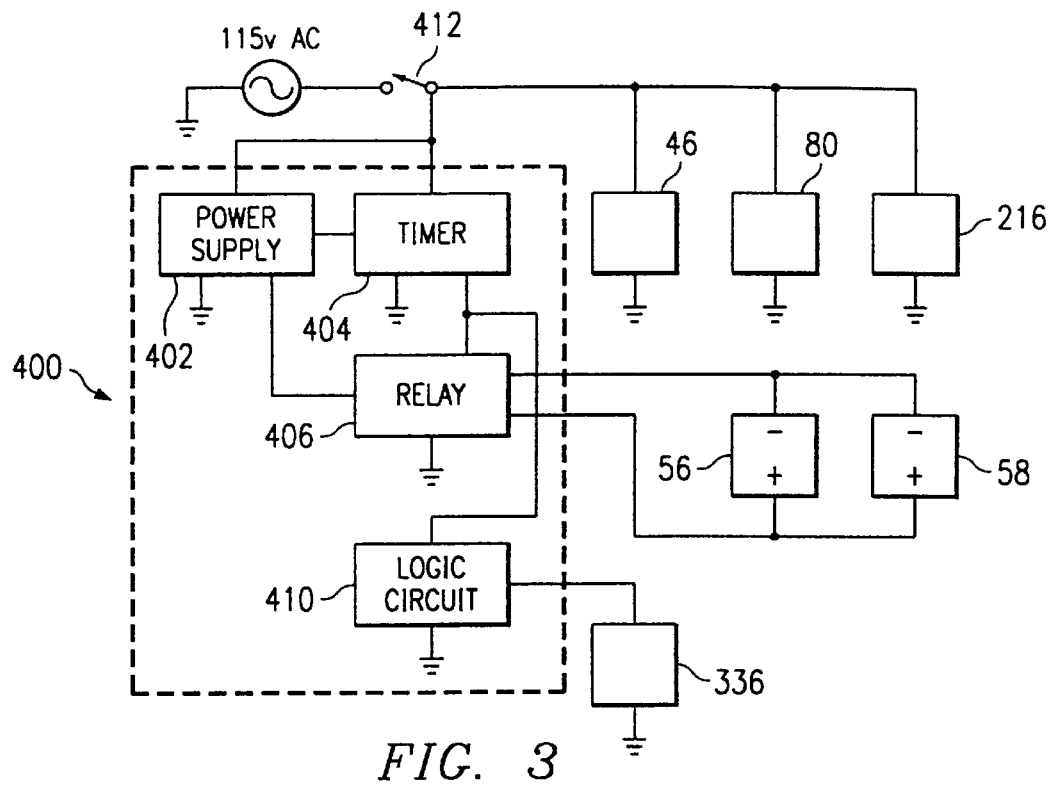
FIG. 3 is a schematic diagram of the control circuit for the tortilla press of FIG. 1.

FIG. 3 is a schematic diagram of controller 400 that controls the functions of tortilla press 10. Controller 400 consists of power supply 402, timer 404, relay 406, and logic circuit 410.

In the preferred embodiment, power supply 402 is connected through master switch 412 to 115 volts A.C. Power supply 402 supplies regulated 12 volt D.C. and regulated 5 volt D.C. power at 5 amps maximum continuous current. In the preferred embodiment, a Minarc Corporation of Glendale, Calif., Model XPF5-115AC is employed. As will be apparent to those skilled in the art, other power supplies providing similar voltage and current can be substituted for this one. Additionally, power supplies with variable output can be used to adjust the intensity of the magnetic field radiated by electromagnets 56, 58. If a variable power supply is used, the result is that the pressing force of the movable press block against the stationary press block, in either orientation, can vary. This results in a variable size and thickness of tortilla by simply adjusting the current of the power supply. This is a major advantage over the prior art because it requires no mechanical adjustments and can be accomplished very quickly without interrupting operation of the invention.

Also connected to 115 volts A.C. through master switch 412 are rod-type electrical heaters 46, 80 in stationary press blocks 24, 26 and movable press block 60 and impeller 216.

Power supply 402 provides 12 volt D.C. power for electromagnets 56, 58 through double-pole, double-throw relay 406. Relay 406 is connected so that when it is energized, electromagnets 56, 58 receive current flowing in one direction, and when it is de-energized, electromagnets 56, 58 receive current forming in the other direction. The parallel connection between relay 406 and electromagnets 56, 58 forces the polarity of the electromagnets to be the same for any given signal from relay 406. In the "on" segments, relay 406 is energized. In the "off" segments, relay 406 is deenergized. Timer 404 provides the signal that energizes and de-energizes relay 406 and the input to logic unit 410.

Figure 4A:
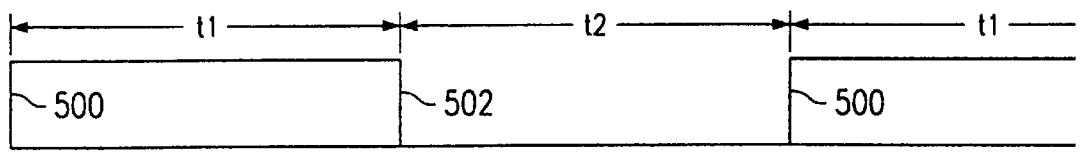
FIG. 4 is a timing diagram illustrating the timing relationship of selected signals of the control circuit of FIG. 3.

FIG. 4(a) represents the timer signal that controls relay 406 and which is input to logic unit 410. As can be seen, the signal consists of equal "on" (T1) and "off" (T2) segments, corresponding to T1,500 and T2,502. In the preferred embodiment, T1 and T2 are both set at 5 seconds, although the times can be easily adjusted by adjusting timer 404 as desired. Shorter times for T1 and T2 result in shorter cooking times for the tortilla, longer times for T1 and T2 result in longer cooking times.

Timer 404 also provides the signal that is the input to logic unit 410. Logic unit 410 consists of a transistor triggering circuit and an RC timer which are well known in the art and therefore will not be described in detail here.

Figure 4B:
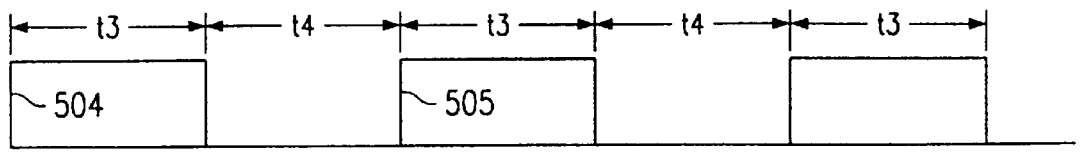

FIG. 4(b) represents the signal produced by the logic circuit 410. The "on" (T3) segments of the logic circuit output are triggered by both leading edge 500 and trailing edge 502 of the timer signal (shown in FIG. 4(a)) that controls electromagnets 56, 58. The logic circuit output is connected to solenoid coil 336 and is of sufficient current to drive the solenoid; therefore, each time the polarity of the current to electromagnets 56, 58 is reversed by relay 406, a pulse is supplied to solenoid coil 336 by logic unit 410, the energized coil extends solenoid piston 330 and advances chain 324, thereby dropping a dough ball B through entrance port 22 of tortilla press 10.

The operation of the preferred embodiment of the present invention will now be described. In operation, the machine is placed near the heated grill surface 202. Before operation is begun, the heated grill surface must reach its operational temperature, usually about 425° F. At this point, master switch 412 is thrown, activating heaters 46 and 80, impeller 216, timer 404, and power supply 402. Heaters 46 and 80 are allowed to rise to their operational temperature, about 425° F., with the aid of heated air drawn through holes 38, 42. Impeller 216, after activation, draws heated air from grill surface 202, through duct 210, and through holes 38, 42. The hot air from heated grill surface 202 raises the temperature of the stationary press blocks to approximately 425°. The hot air is drawn through impeller 216 and upward through manifold 220, being distributed through arms 220 and 224, to nozzles 222 and 224.

After operational temperature is reached, dough ball B is manually placed in the upwardly facing cups 326 of feeder assembly 300. Timer 404 then activates relay 406. Activating relay 406 reverses the polarity of the current applied to electromagnets 56, 58. As a result, the magnetic polarity of electromagnets 56, 58 is also reversed. For instance, as shown in FIG. 1, the pole of each electromagnet facing the movable press block is north. After the current is reversed by relay 406, left electromagnet 58 repels the north pole of permanent magnet 72 and the left face 64 of movable press block 60, and right electromagnet 58 attracts south pole of magnet 74 in right face 66 of movable press block 60. Thus, movable press block 60 is moved to the right magnetically. Simultaneously, the signal from timer 406 causes logic unit 410 to produce pulse T3. Pulse T3 activates solenoid coil 336, which advances chain 324, causing rightmost upwardly facing cup 326 (as viewed in FIG. 1) to rotate to a vertical position over entry port 22 in lid 20 of enclosure 12, thereby dropping a dough ball B through entry port 22. In the preferred embodiment, the upward movement of solenoid piston 330 takes longer than the arcuate movement of the movable press block from one position to the other; therefore, movable press block 60 will have switched places before dough ball B falls onto either shuttle surface 74, 76 of movable press block 60, in each pressing cycle. For instance, if movable press block 60 comes to rest in the left position as shown in FIG. 1, dough ball B will be deflected to the right by right shuttle surface 76 of movable press block 60, thereby causing dough ball B to fall between right press face 66 of movable press block 60 and inner face 36 of right stationary press block 26.

After time T1 as shown in FIG. 4(a), timer 404 deactivates relay 406. As a result, the polarity of the electrical current supplied to electromagnets 56, 58 is again reversed, causing the pole of each electromagnet 56, 58 facing the movable press block to now become south. Thus, electromagnet 58 in right stationary press block 26 repels permanent magnet 74 in right face 66 of movable press block 60, and left electromagnet 56 attracts permanent magnet 72 in left face 64 of movable press block 60. This causes movable press block 60 to pivot to the left position, pressing waiting dough ball B into tortilla T. Tortilla T is then pressed and toasted for the duration of time T2. At the same time, timer 404 causes logic unit 410 to send another pulse to solenoid 336. Solenoid coil 336, in turn, causes another dough ball B to be dropped through empty port 22 and lid 20 of enclosure 12. As movable press block 60 is in the right position, dough ball B is deflected to the left between left face 64 of movable press block 60 and interface 34 of left stationary press block 24.

Due to the inclination of the inner face 36 of the right stationary press block 26, and the heated air that is blown from the nozzles 222, 224, the toasted tortilla slides downwardly through the slot 16 in the bottom 14 of the enclosure 12 and onto grill surface 202. As the movable press block 60 moves to the left, current is supplied to the solenoid coil 336, advancing the chain 324 and dropping another dough ball, B, beginning process described above again.

After time T2, as shown in FIG. 4B, timer 404 then reactivates relay 406, thereby reversing the polarity of the current supplied electromagnets 56, 68. Movable press block 60 then swings from right to left as shown in FIG. 1, thereby releasing the press tortilla on the right face of stationary press block 26 and pressing the waiting dough ball between the face of stationary press block 24 and the left face 64 of movable press block 60. This cycle repeats until switch 412 is opened, stopping operation of tortilla press 10.

Although the invention has been described of terms of specified embodiments which are set forth in detail, it should be understood that this by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A method of pressing deformable dough portions comprising the steps of:

providing a pair of opposing platens;

providing a central press block positioned between the platens;

providing a coercive element, attached to the platens, to alternately urge the press plate toward each platen;

placing a dough portion between the press block and the first platen;

cycling the press block toward the first platen;

placing a second dough portion between the press block and the second platen; and cycling the press block toward the second platen.

2. The method of claim 1 further comprising the step of heating the platens.

3. The method of claim 1 further comprising the steps of:

providing a source of air pressure; and directing the air pressure toward each of the platens.

4. The method of claim 1 including the step of:

providing said coercive element as an electromagnet.

5. The method set forth in claim 4 wherein:

the step of cycling said press block comprises energizing said electromagnet with current of one polarity.

6. The method set forth in claim 5 wherein:

the step of cycling said press block comprises reversing the polarity of current energizing said electromagnet.

7. The method set forth in claim 1 including the step of:

placing said dough portion between said press block and said first platen in timed relationship to energizing said coercive element.

8. The method set forth in claim 1 including the step of:

providing said coercive element as electromagnets in each of said platens and energizing said electromagnets with current flowing in one direction to cycle said press block toward said first platen and then energizing said electromagnets with current in another direction to cycle said press block toward said second platen.

9. The method set forth in claim 8 including the step of:

timing the placement of a dough portion between said press block and said platens, respectively, in relation to energizing said electromagnets.

10. The method set forth in claim 1 further comprising the step of:

heating said platens with hot air directed toward said platens, respectively.

11. The method set forth in claim 1 including the step of:

heating said platens with electrical heaters disposed adjacent said platens.

12. The method set forth in claim 1 including the step of:

heating said platens with electrical heaters formed integrally with said platens.

13. The method set forth in claim 1 including the step of:

placing a low friction coating on cooperating surfaces of said press block and said platens to reduce friction between said dough portions and said surfaces, respectively.

14. The method set forth in claim 13 wherein:

the step of placing said coating comprises coating said surfaces with polytetrafluoroethylene.

15. The method set forth in claim 1 including the step of:

placing dough portions between said press block and said platens, respectively, with a feeder assembly.

16. The method set forth in claim 15 wherein:

said dough portions are placed between said press block and said platens by dispensing said dough portions, respectively, from plural cups of said feeder assembly.

17. The method set forth in claim 1 wherein:

the step of placing said dough portion between said press block and said first platen comprises dropping said dough portion onto a first surface of said press block for guiding said dough portion into a position between said press block and said first platen; and the step of placing said second dough portion between said press block and said second platen comprises dropping a dough portion onto a second surface of said press block for guiding said second dough portion to a position between said press block and said second platen.

18. A method of pressing deformable dough portions into flat dough products comprising the steps of:

providing an apparatus including a pair of opposed platens, a central press block disposed between said platens and movable toward and away from each of said platens and a coercive element operable to alternately urge said press block toward each of said platens;

placing a first dough portion between said press block and one of said platens and causing said coercive element to move said press block toward said one platen to flatten said first dough portion; and placing a second dough portion between said press block and the other of said platens and causing said coercive element to move said press block toward said other platen to flatten said second dough portion.

19. The method set forth in claim 18 including the step of:

providing a feeder assembly disposed adjacent said apparatus for feeding said dough portions seriatim to said apparatus for placement between said press block and said platens, respectively.

20. The method set forth in claim 18 including the step of:

providing said coercive element as magnetic means for moving said press block from a first pressing position close to one of said platens to a second pressing position close to the other of said platens.

21. The method set forth in claim 20 including the step of:

providing said magnetic means as at least one permanent magnet connected to said press block and providing electromagnets connected to each of said platens, respectively.

22. The method set forth in claim 21 including the step of:

energizing each of said electromagnets to cause said press block to move toward said first platen and said second platen, respectively, to press said dough portions between said press block and said platens, respectively.

23. The method set forth in claim 22 including the step of:

timing the placement of dough portions between said press block and said platens, respectively, in relation to energizing said electromagnets.

24. The method set forth in claim 18 wherein:

the step of placing said dough portion between said press block and said one platen comprises placing said dough portion on a first surface of said press block for guiding said dough portion into a position between said press block and said one platen; and the step of placing said second dough portion between said press block and said other platen comprises placing a dough portion on a second surface of said press block for guiding said second dough portion to a position between said press block and said other platen.

25. A method of pressing deformable dough portions into flat dough products comprising the steps of:

providing an apparatus including first and second opposed platens, a central press block disposed between said platens and movable toward and away from each of said platens, said press block including first and second guide surfaces for guiding dough portions to positions between said press block and said platens, respectively, a coercive element operable to alternately urge said press block toward each platen and a feeder assembly disposed adjacent said apparatus for feeding dough portions seriatim to said press block for placement between said press block and said platens, respectively, as guided by said guide surfaces on said press block, respectively;

energizing said coercive element to cause said press block to move toward said first platen and said second platen, respectively, to press dough portions between said press block and said platens, respectively; and timing the feeding of said dough portions to said press block for placement between said press block and said platens, respectively, in relation to energizing said coercive element.

\* \* \* \* \*